July 8, 1924.

J. P. McLAVEY

MILEAGE REGISTER

Filed Sept. 12, 1923

1,500,407

Inventor
John P. McLavey.
by Orrin & Hague, Attys.

Patented July 8, 1924.

1,500,407

UNITED STATES PATENT OFFICE.

JOHN P. McLAVEY, OF IOWA FALLS, IOWA.

MILEAGE REGISTER.

Application filed September 12, 1923. Serial No. 662,248.

*To all whom it may concern:*

Be it known that I, JOHN P. McLAVEY, a citizen of the United States, and a resident of Iowa Falls, in the county of Hardin and State of Iowa, have invented a certain new and useful Mileage Register, of which the following is a specification.

The object of my invention is to provide a mileage register of simple, durable and inexpensive construction which may be easily and quickly attached to the cowl board of an automobile or any other convenient place, for the purpose of reminding the operator of the automobile when it is time to fill it with oil or gasoline.

More specifically it is the object of my invention to provide an improved register having a series of numeral bearing wheels adapted and arranged so that any of the wheels may be operated to place a predetermined arrangement of the numerals in such position that they may be read by the operator and compared with the reading of the speedometer for the purpose above described.

My invention consists in the construction, arrangement and combination of the various parts of the device, whereby the objects contemplated are attained, as hereinafter more fully set forth, pointed out in my claims, and illustrated in the accompanying drawings, in which:

Figure 4:
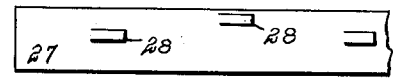
Figure 4 is an enlarged detail view of the spring retaining member.
Figure 5:
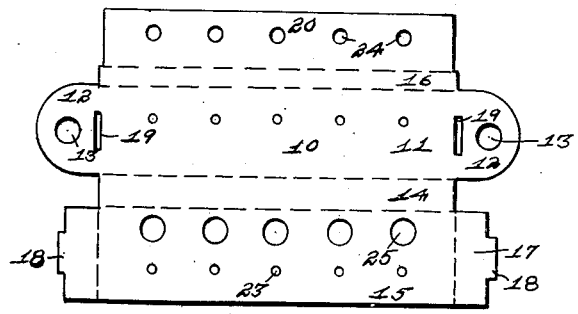
Figure 5 is a view showing the case in blank form.

The numeral 10 indicates the casing of my improved register which is formed of a single piece of sheet metal blank in the form shown in Figure 5 and comprises a back portion 11 having extending ears 12, each of which is provided with an opening 13 for securing the register to a cowl board.

Figure 3:
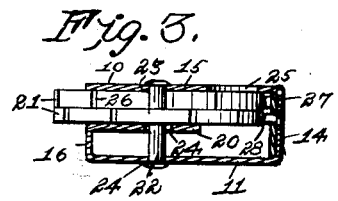
Figure 3 is a detail transverse sectional view taken on the line 3—3 of Figure 1.

The blank is provided with an upper edge portion 14 and front portion 15 and a lower edge portion 16 folded in the manner shown in Figure 3. The front portion 15 is provided with end portions 17 each of which is provided with a lug 18 designed to enter the openings 19 in the member 11.

The bottom edge 16 is provided with an inwardly extending portion 20 designed to receive between it and the front 15 a series of numeral carrying wheels 21, each of which is provided with a pivot member 22, the pivot members being journaled in openings 23 in the front and back members 15 and 11.

Figure 2:
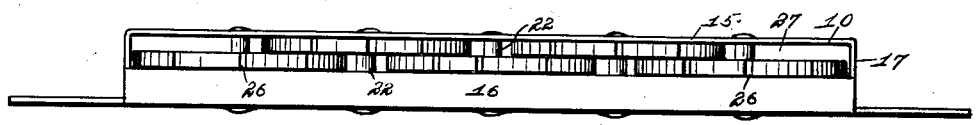
Figure 2 is a bottom view of the same.
Figure 1:
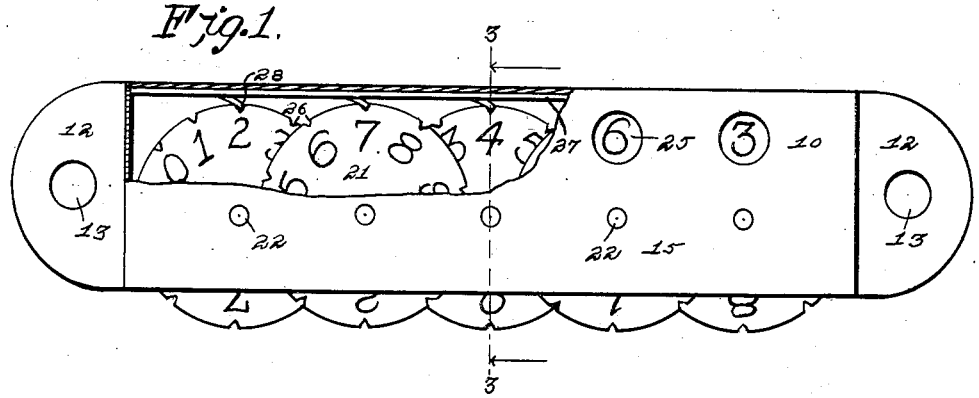
Figure 1 is a front elevation of my improved register having a portion of the front plate removed.

The member 20 is provided with a series of openings 24 through which the pivot members extend. The said openings are larger than the pivots. The member 20 is formed resilient and in such manner that the numeral carrying wheels 21 are frictionally held into engagement with each other, the said wheels being arranged in staggered overlapping relation as shown in Figures 1 and 2. Each of the wheels 21 is provided with a zero and nine digits, which are formed in the front faces of the wheels and designed to move in alinement with a series of openings 25 in the front member 15.

The edge of each of the members 21 is provided with a series of notches 26, one opposite each of the digits. These notches are for the purpose of providing means to assist in rotating the said wheels, the lower edge of which extends downwardly below the lower edge of the front plate 15, and also for the purpose of holding the said wheels against accidental movement by means of a spring plate 27 having a series of spring members 28, one for each of the said wheels, the said members 28 being designed to enter the notches 26.

The plate 27 is formed of a single piece of sheet metal having the members 28 punched inwardly therefrom, the plate being of a length equal to the length of the inside body portion 10 and of a height equal to the height of said body portion. The plate is placed loosely in position before the wheels 21 are placed.

The practical operation of the device is as follows:

Assuming that the speedometer reading is 26,963 and that the operator has just filled the automobile with oil, and that the car will run five hundred miles before it needs further attention, the operator then simply adjusts the wheels of the register until they read 27,463, by placing his finger against the lower edge of the wheels and rotating them in either direction until the proper number has been placed in position opposite the openings 25. This will act as a reminder that when the speedometer reading agrees with the register reading, it is time to refill the automobile with oil.

It will be seen that the register might be used for other purposes such as filling of gasoline or changing tires.

By forming the casing of a single piece of sheet metal, I have provided a construction which is very cheap and durable, and by providing the inwardly extending portion 20, I have provided yieldable means whereby the wheels 21 will be frictionally held together and rattling prevented, while the members 28 will provide means whereby the wheels will be positively secured in position until they are further actuated by the operator.

I claim as my invention:

1. A register having a body portion formed of a single piece of material provided with a back and top edge and a front plate and a bottom edge member, said bottom edge member being turned inwardly to form a spring, a series of numeral wheels pivotally mounted between the said inwardly extending portion and the front plate, each of said numeral wheels being provided with a series of notches in its edge, a spring plate adjacent to the inner edge of said wheels, said plate being provided with a series of spring members, one for each of said wheels and designed to engage the notches when the wheels have been placed in a predetermined position.

2. A register comprising a casing having front and back members, the front member being provided with a series of openings, a series of numeral wheels pivotally mounted between said front and back members with one of their edges extending beyond the outer edge of said front member, said wheels being arranged in staggered overlapping relation with each other, means for yieldably holding the wheels together, and means for yieldably holding the wheels against rotation, said means comprising a flat piece of spring metal having a series of spring members punched out from it, each of said members being designed to engage a corresponding wheel, said spring member being loosely mounted between the closed edge of said casing and said numeral wheels.

3. A register having a body portion formed of a single piece of metal and bent to form overlapping front and back portions, one edge of said member being bent inwardly to form a spring, a series of numeral wheels mounted between the said spring and the other edge of said member, means for pivotally mounting the wheels between said members.

4. A register having a body portion formed of a single piece of metal provided with a back and top edge and front plates and a bottom edge member, said bottom edge member being turned inwardly to form a spring, a series of numeral wheels pivotally mounted between said inwardly extending portion and the front plate, each of said wheels being provided with a series of notches in its edge, and yieldable means for engaging the notches of said wheels, substantially as described and for the purposes stated.

Des Moines, Iowa, July 6, 1923.

JOHN P. McLAVEY.